(12) United States Patent
Kashiwagi

(10) Patent No.: US 7,678,842 B2
(45) Date of Patent: Mar. 16, 2010

(54) RADIATION-CURABLE SILICONE RUBBER COMPOSITION

(75) Inventor: Tsutomu Kashiwagi, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 367 days.

(21) Appl. No.: 11/559,089

(22) Filed: Nov. 13, 2006

(65) Prior Publication Data

US 2007/0112090 A1 May 17, 2007

(30) Foreign Application Priority Data

Nov. 14, 2005 (JP) ............... 2005-328640

(51) Int. Cl.
*C03C 25/10* (2006.01)
*C08F 283/12* (2006.01)

(52) U.S. Cl. ............ 522/172; 522/66; 522/64; 522/42; 522/99; 528/17; 528/32

(58) Field of Classification Search ......... 522/172, 522/42, 64, 66, 99; 528/10–43
See application file for complete search history.

(56) References Cited

U.S. PATENT DOCUMENTS

| | | | |
|---|---|---|---|
| 4,733,942 A | 3/1988 | Hida et al. | |
| 4,943,613 A | 7/1990 | Arai et al. | |
| 5,391,677 A * | 2/1995 | Arai et al. | ........ 528/18 |
| 6,069,186 A | 5/2000 | Okinoshima et al. | |

FOREIGN PATENT DOCUMENTS

| | | |
|---|---|---|
| JP | 1-304108 | 12/1989 |
| JP | 4-36353 | 2/1992 |
| JP | 11-302348 | 11/1999 |
| JP | 2005-36050 | 2/2005 |

* cited by examiner

*Primary Examiner*—David Wu
*Assistant Examiner*—Jessica Paul
(74) *Attorney, Agent, or Firm*—Oblon, Spivak, McClelland, Maier & Neustadt, L.L.P.

(57) ABSTRACT

Provided is a radiation-curable silicone rubber composition comprising: (A) a specific organopolysiloxane, which at each molecular chain terminal contains two or three silicon-containing groups that each contain a plurality of (from 2 to 9) (meth)acryloyl groups (in other words, a specific organopolysiloxane containing from 8 to 54 (meth)acryloyl groups within each molecule); and (B) a radiation sensitizer. The composition cures easily and favorably upon irradiation with low intensity, low energy radiation, and in particular upon irradiation with ultraviolet light emitted from a UV-LED light source. A cured coating generated from the composition rapidly develops favorable adhesion to a wide variety of substrates, and provides excellent corrosion prevention for the substrate, even under severe conditions.

16 Claims, No Drawings

RADIATION-CURABLE SILICONE RUBBER COMPOSITION

BACKGROUND OF THE INVENTION

1. Field of the Invention

The present invention relates to a radiation-curable silicone rubber composition that exhibits excellent curability upon irradiation with low intensity, low energy radiation, and in particular upon irradiation with ultraviolet light emitted from an ultraviolet light emitting diode (UV-LED), and which generates a cured coating that provides excellent corrosion prevention for electrical and electronic devices such as electrodes for liquid crystals and the like, and other electrical and electronic components.

2. Description of the Prior Art

Examples of known organopolysiloxane compositions that can be converted to cured products by irradiation with ultraviolet light or the like include radiation-curable coating agents for optical fibers, comprising an organopolysiloxane that contains a plurality of vinyl functional groups such as acryloyloxy groups or methacryloyloxy groups, and a photopolymerization initiator (see patent reference 1). In recent years, additional requirements are being demanded of these organopolysiloxane compositions, including the ability to use newly marketed UV-LED light sources as the radiation source, and the ability to cure the composition at a rapid curing rate even when irradiation is conducted using low intensity, low energy radiation. However the compositions of the patent reference 1 suffer from slow curing rates, meaning they are unable to meet these demands, and are unsuitable for use as coating agents, adhesives, or potting agents for electrical and electronic devices.

The applicants of the present invention have previously proposed a radiation-curable silicone rubber composition comprising an organopolysiloxane, which contains one radiation-sensitive organic group containing a plurality of (meth)acryloyloxy groups at each of the molecular chain terminals, a photosensitizer, and an organosilicon compound that contains an alkoxy group (see patent reference 2). However, a composition capable of satisfying the above demands has yet to be disclosed, or even suggested.

[Patent Reference 1] U.S. Pat. No. 4,733,942
[Patent Reference 2] U.S. Pat. No. 6,069,186

SUMMARY OF THE INVENTION

An object of the present invention is to provide a radiation-curable composition that cures easily and favorably upon irradiation with low intensity, low energy radiation, and in particular upon irradiation with ultraviolet light emitted from a UV-LED light source, and which upon curing, generates a cured coating that rapidly develops favorable adhesion to a wide variety of substrates, and provides excellent corrosion prevention for the substrate, even under severe conditions.

The inventors of the present invention discovered that a radiation-curable silicone rubber composition comprising a specific organopolysiloxane, which at each molecular chain terminal contains three silicon-containing groups that each contain a plurality of (meth)acryloyl groups, and a radiation sensitizer could be cured at a rapid curing rate using a UV-LED light source as the radiation source, even if the radiation was of low intensity and low energy, and they were thus able to complete the present invention.

In other words, in order to achieve the object described above, the present invention provides a radiation-curable silicone rubber composition, comprising (A) an organopolysiloxane represented by a general formula (1) shown below:

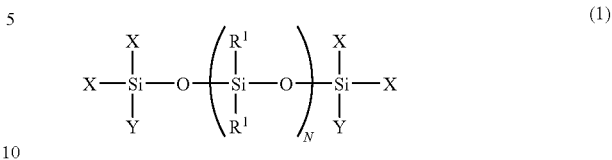

[wherein, each $R^1$ represents, independently, an unsubstituted or substituted monovalent hydrocarbon group of 1 to 9 carbon atoms, each X represents, independently, a group represented by a general formula (2) shown below:

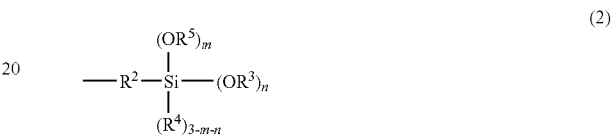

{wherein, $R^2$ represents a bivalent hydrocarbon group of 2 to 4 carbon atoms or an oxygen atom, each $R^3$ represents, independently, a monovalent organic group of 4 to 25 carbon atoms that contains from 1 to 3 (meth)acryloyl groups represented by a general formula shown below:

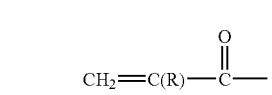

(wherein, R represents a hydrogen atom or a methyl group), each $R^4$ represents, independently, an unsubstituted or substituted monovalent hydrocarbon group of 1 to 9 carbon atoms, each $R^5$ represents, independently, a monovalent hydrocarbon group of 1 to 18 carbon atoms, n represents an integer from 1 to 3, m represents an integer from 0 to 2, and n+m represents an integer from 1 to 3, although when n=1, the $R^3$ group contains from 2 to 3 (meth)acryloyl groups}, each Y represents, independently, a group represented by X, $R^1$ or $OR^1$ (wherein, X and $R^1$ are as defined above), and N represents an integer from 8 to 10,000], and (B) a radiation sensitizer.

A second aspect of the present invention provides a cured product obtained by irradiating the above composition with radiation.

A third aspect of the present invention provides a sealing agent comprising the above composition.

A fourth aspect of the present invention provides a process for sealing an electrical or electronic device with a cured product of the above composition, comprising the steps of:

coating said electrical or electronic device with said composition and irradiating said composition with radiation to cure said composition on said electrical or electronic device.

A fifth aspect of the present invention provides an electrical or electronic device sealed by a cured product obtained by irradiating the above composition with radiation.

A composition of the present invention can be cured easily and favorably by irradiation with radiation such as ultraviolet light, and in particular ultraviolet light emitted from a UV-LED light source, even when the radiation is of extremely low intensity and of minimal energy. As a result, the composition is very useful as a protective coating agent or sealing agent for the electrodes of liquid crystal displays, organic EL displays, flat panel displays, and plasma displays, which are easily affected by detrimental ultraviolet light or heat, and for other electrical and electronic components, and using the composition enables an improvement in the reliability of these types of products.

DETAILED DESCRIPTION OF THE PREFERRED EMBODIMENTS

As follows is a more detailed description of the present invention. In this description, the terms "(meth)acryloyl", "(meth)acrylic" and "(meth)acrylate" are generic terms that include acryloyl and methacryloyl, acrylic and methacrylic, and acrylate and methacrylate respectively. Furthermore, "Me" represents a methyl group, "Et" represents an ethyl group, "Pr" represents a propyl group, "iPr" represents an isopropyl group, and "Ph" represents a phenyl group.

[(A) Organopolysiloxane]

The organopolysiloxane of the component (A) is represented by the general formula (1) shown above, and is used as the base polymer of the radiation-curable silicone rubber composition of the present invention. The organopolysiloxane of the component (A) contains —$OR^3$ groups as radiation-polymerizable groups (namely, contains a plurality of, and specifically from 4 to 27 and preferably from 6 to 18, (meth)acryloyl groups at each molecular chain terminal [in other words, contains a total of 8 to 54, and preferably from 12 to 36, (meth)acryloyl groups within each molecule]), and consequently undergoes polymerization readily upon irradiation with radiation such as ultraviolet radiation, far ultraviolet radiation, electron beams, X-rays or γ-rays, thereby causing curing of the composition of the present invention. The component (A) may use either a single compound, or a combination of two or more different compounds.

Specific examples of the group $R^1$ include alkyl groups such as a methyl group, ethyl group, propyl group, isopropyl group, butyl group, isobutyl group, tert-butyl group, pentyl group, hexyl group, heptyl group, 2-ethylhexyl group, octyl group or nonyl group; cycloalkyl groups such as a cyclohexyl group or cycloheptyl group; alkenyl groups such as a vinyl group, allyl group, propenyl group, isopropenyl group, butenyl group or hexenyl group; aryl groups such as a phenyl group or tolyl group; aralkyl groups such as a benzyl group, phenylethyl group or 3-phenylpropyl group; and groups in which at least a portion of the hydrogen atoms bonded to carbon atoms within these hydrocarbon groups have been substituted with a substituent group such as a halogen atom or a cyano group, including a chloromethyl group, cyanoethyl group or 3,3,3-trifluoropropyl group.

Of these groups, methyl groups preferably account for at least 50 mol %, even more preferably 80 mol % or more, and most preferably 90 mol % or more (that is, from 90 to 100 mol %) of all the $R^1$ groups. In addition, phenyl groups preferably account for no more than 25 mol %, and preferably no more than 10 mol % (that is, from 0 to 10 mol %) of all the $R^1$ groups.

The group $R^2$ in the above general formula (2) represents a bivalent hydrocarbon group of 2 to 4 carbon atoms or an oxygen atom, but from the viewpoint of achieving more favorable chemical stability relative to hydrolysis or the like, a bivalent hydrocarbon group is preferred. Specific examples of suitable bivalent hydrocarbon groups include alkylene groups such as an ethylene group, propylene group (trimethylene group), methylethylene group or tetramethylene group, and of these, an ethylene group is preferred.

The group $R^3$ in the above general formula (2) represents a monovalent organic group of 4 to 25 carbon atoms, and preferably from 5 to 20 carbon atoms, that contains from 1 to 3, preferably from 2 to 3, and most preferably 3, (meth)acryloyl groups, for example, in the form of (meth)acryloyloxy groups. The group $R^3$ preferably contains from 2 to 3 (meth)acryloyloxy groups. Specific examples of suitable $R^3$ groups include alkyl groups of 1 to 10 carbon atoms, and preferably from 2 to 6 carbon atoms, that have been substituted with 1 to 3 (meth)acryloyloxy groups, including $CH_2$=$CHCOOCH_2CH_2$—, [$CH_2$=$C(CH_3)COOCH_2$]$_3$C—$CH_2$—, ($CH_2$=$CHCOOCH_2$)$_3$C—$CH_2$—, ($CH_2$=$CHCOOCH_2$)$_2$C($C_2H_5$)$CH_2$—, and the groups represented by the formulas below.

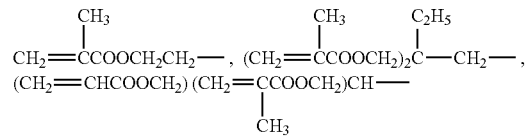

Of these, [$CH_2$=$C(CH_3)COOCH_2$]$_3$C—$CH_2$—, ($CH_2$=$CHCOOCH_2$)$_3$C—$CH_2$—, ($CH_2$=$CHCOOCH_2$)$_2$C($C_2H_5$)$CH_2$—, and the group represented by the formula below are preferred,

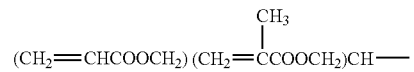

and the groups [$CH_2$=$C(CH_3)COOCH_2$]$_3$C—$CH_2$—, ($CH_2$=$CHCOOCH_2$)$_3$C—$CH_2$—, and the group represented by the formula below are particularly desirable.

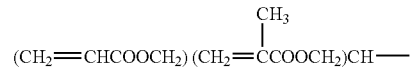

Each group $R^4$ in the above general formula (2) represents, independently, an unsubstituted or substituted monovalent hydrocarbon group of 1 to 9 carbon atoms, and preferably from 1 to 6 carbon atoms. Specific examples of the group $R^4$ include the same groups as those listed above in relation to the group $R^1$ within the general formula (1), and in the same manner as was described for $R^1$, methyl groups preferably account for at least 50 mol %, even more preferably 80 mol % or more, and most preferably 90 mol % or more (that is, from 90 to 100 mol %) of all the $R^4$ groups, whereas phenyl groups preferably account for no more than 25 mol %, and preferably no more than 10 mol % (that is, from 0 to 10 mol %) of all the $R^4$ groups.

Each group $R^5$ in the above general formula (2) represents, independently, a monovalent hydrocarbon group of 1 to 18 carbon atoms, and preferably from 1 to 8 carbon atoms. Specific examples of the group $R^5$ include alkyl groups such as a methyl group, ethyl group, propyl group, isopropyl group, butyl group, tert-butyl group, pentyl group or neopentyl group; cycloalkyl groups such as a cyclohexyl group; aryl groups such as a phenyl group; and alkenyl groups such as an allyl group, propenyl group or butenyl group. Of these, the group $R^5$ is preferably not an aliphatic unsaturated group such as an alkenyl group.

Specific examples of the group X in the general formula (1) include the formulas shown below.

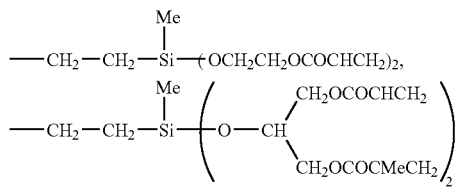

Each group Y in the above general formula (1) represents, independently, a group represented by X, $R^1$ or $OR^1$; preferably represents X and/or an $OR^1$ group, including alkoxy groups such as a methoxy group, ethoxy group, propoxy group, isopropoxy group, butoxy group, isobutoxy group or tert-butoxy group; and more preferably represents X.

In the general formula (1), N represents an integer from 8 to 10,000, and is preferably an integer from 48 to 1,000.

Specific examples of preferred forms of the organopolysiloxane represented by the general formula (1) include the compounds represented by the formula below.

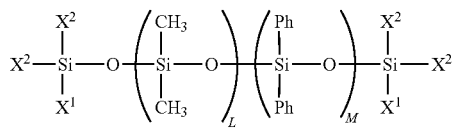

[wherein, each $X^1$ represents, independently, either a group represented by the formula shown below,

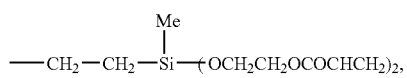

of at least one alkoxy group selected from amongst a methoxy group, ethoxy group, propoxy group, isopropoxy group, butoxy group, isobutoxy group and tert-butoxy group, $X^2$ is a group represented by a formula shown below,

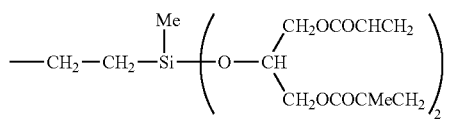

L represents an integer from 10 to 9,995, and M represents an integer from 5 to 5,000].

The organopolysiloxane of the component (A) can be prepared, for example, by a dehydrochlorination reaction of the corresponding chlorosiloxane, a (meth)acryloyl group-containing compound that also contains an active hydroxyl group, represented by the formula $R^3OH$ (wherein, $R^3$ is as defined above), and a compound represented by the formula $R^5OH$ (wherein, $R^5$ is as defined above). Examples of the above chlorosiloxane include addition reaction products of an organopolysiloxane containing 3 alkenyl groups at each molecular chain terminal, as represented by a formula shown below:

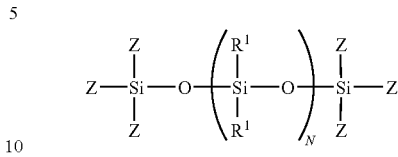

(wherein, Z is an alkenyl group, and $R^1$ and N are as defined above), and an (organo)hydrogenchlorosilane containing an SiH linkage capable of undergoing hydrosilylation, as represented by a formula: $HSi(R^4)_{3-m-n}Cl_{m+n}$ (wherein, $R^4$, n and m are as defined above). A person skilled in the art should be able to select an appropriate Z group in accordance with the nature of the $R^2$ group in the above general formula (2). For example, if $R^2$ is an ethylene group, then Z should be a vinyl group, whereas if $R^2$ is a propylene group (a trimethylene group), then Z should be an allyl group.

Furthermore, examples of the above (meth)acryloyl group-containing compound that also contains an active hydroxyl group include 2-hydroxyethyl (meth)acrylate, trimethylolpropane di(meth)acrylate, pentaerythritol tri(meth)acrylate, and 2-hydroxy-1-acryloyloxy-3-methacryloyloxypropane.

The organopolysiloxane of the component (A) preferably includes a plurality of (meth)acryloyl groups bonded to the single silicon atom shown in the above general formula (2), and consequently the use of trimethylolpropane di(meth)acrylate or pentaerythritol tri(meth)acrylate is preferred, and pentaerythritol tri(meth)acrylate is particularly desirable.

[(B) Radiation Sensitizer]

There are no particular restrictions on the radiation sensitizer of the component (B). The component (B) may use either a single compound, or a combination of two or more different compounds. Examples of preferred compounds for the component (B) include benzoyl compounds (or phenyl ketone compounds) such as benzophenone, and particularly benzoyl compounds (or phenyl ketone compounds) having a hydroxy group bonded to the α-position carbon atom from the carbonyl group, such as 1-hydroxycyclohexyl phenyl ketone, 2-hydroxy-2-methyl-1-phenylpropan-1-one, and 1-(4-isopropylphenyl)-2-hydroxy-2-methylpropan-1-one; 2-methyl-1-(4-(methylthio)phenyl)-2-morpholinopropan-1-one; organophosphine oxide compounds such as 2,4,6-trimethylbenzoyldiphenylphosphine oxide, bisacylmonoorganophosphine oxide and bis(2,6-dimethoxybenzoyl)-2,4,4-trimethylpentylphosphine oxide; benzoin ether compounds such as isobutyl benzoin ether; ketal compounds such as acetophenone diethyl ketal; thioxanthone-based compounds; and acetophenone-based compounds. Because the radiation emitted from a UV-LED is of a single wavelength, if a UV-LED is used as the light source, then the use of a radiation sensitizer that has an absorption spectrum peak in the region from 340 to 400 nm is particularly effective. By combining the radiation sensitizer with a thioxanthone-based initiator or a benzophenone-based initiator, the surface curability of the resulting composition can be further improved.

There are no particular restrictions on the quantity of the component (B), which need only be sufficient to ensure effective curing of the composition of the present invention upon irradiation with ultraviolet light or the like. The quantity of the component (B) is preferably within a range from 0.1 to 10 parts by mass, even more preferably from 0.5 to 10 parts by mass, and most preferably from 1.0 to 5.0 parts by mass, per 100 parts by mass of the above component (A).

[(C) Titanium-Containing Organic Compound]

In a composition of the present invention, in addition to the components (A) and (B) described above, at least one titanium-containing organic compound (C) selected from the group consisting of titanate compounds and titanium chelate compounds may also be added as an optional component according to need. The component (C) is added as an adhesion assistant, to improve the adhesiveness of the cured product obtained from the composition of the present invention. By adding the component (C) to the composition, a more favorable level of adhesion to a wide variety of substrates can be imparted even more rapidly to the cured product upon curing of the composition by irradiation. The component (C) may use either a single compound, or a combination of two or more different compounds.

Examples of the component (C) include the titanate compounds represented by the general formula shown below.

(wherein, $R^6$ represents an alkyl group of 1 to 8 carbon atoms, and preferably from 2 to 4 carbon atoms, $R^7$, $R^8$ and $R^9$ each represent, independently, an alkyl group or alkoxy group of 1 to 10 carbon atoms, and preferably from 1 to 8 carbon atoms, and p represents an integer from 0 to 4).

Specific examples of the group $R^6$ include alkyl groups such as a methyl group, ethyl group, propyl group, isopropyl group, butyl group, isobutyl group, tert-butyl group, hexyl group, 2-ethylhexyl group or octyl group.

Specific examples of the groups $R^7$ to $R^9$ include alkyl groups such as a methyl group, ethyl group, propyl group, isopropyl group, butyl group, isobutyl group, tert-butyl group, pentyl group, hexyl group, heptyl group, 2-ethylhexyl group, octyl group, nonyl group or decyl group; and alkoxy groups such as a methoxy group, ethoxy group, propoxy group, isopropoxy group, butoxy group, isobutoxy group, tert-butoxy group, pentyloxy group, hexyloxy group, octyloxy group or decyloxy group.

Specific examples of the compounds represented by the above general formula include titanate compounds such as tetramethyl titanate, tetraethyl titanate, tetrapropyl titanate, tetraisopropyl titanate, tetrabutyl titanate, tetraisobutyl titanate, tetrahexyl titanate and tetra(2-ethylhexyl) titanate; and titanium compounds that contain a triorganosiloxy group such as a trialkylsiloxy group, alkoxydialkylsiloxy group, trialkoxysiloxy group or alkyldialkoxysiloxy group, including $(C_3H_7O)_3TiOSi(CH_3)(OC_3H_7)_2$, $(C_3H_7O)_3TiOSi(CH_3)_2(OC_3H_7)$, $[(CH_3)_3SiO]_3TiOSi(CH_3)_2(OC_3H_7)$ and $[(CH_3)_3SiO]_4Ti$.

Other possible compounds of the component (C) include titanium chelate compounds that contain at least one ligand selected from amongst an acetylacetonato group, a methylacetoacetato group and an ethylacetoacetato group, and may also contain a silicon atom-containing group, wherein if the titanium chelate compound contains a silicon atom-containing group, the titanium atom within the titanium chelate compound and the silicon atom within the silicon atom-containing group are bonded together via an oxygen atom. Specific examples of this type of titanium chelate compound include the compounds shown below.

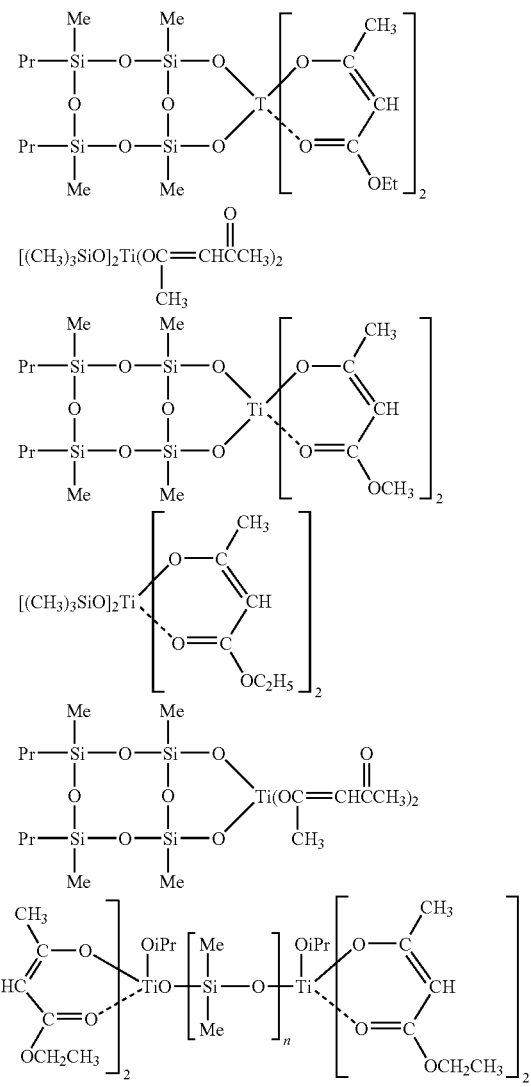

(wherein, n represents an integer from 2 to 100)

In those cases where a component (C) is added to the composition of the present invention, the quantity of the component (C) may be appropriately adjusted within a range up to and including 20 parts by mass (namely, from 0 to 20 parts by mass) per 100 parts by mass of the component (A). The quantity of the component (C) is preferably within a range from 0.001 to 20 parts by mass, even more preferably from 0.01 to 10 parts by mass, and most preferably from 0.1 to 5 parts by mass, per 100 parts by mass of the component (A).

[Other Components]

Besides the components (A) to (C) described above, other components may also be added to the composition of the present invention, provided such addition does not impair the object or effects of the present invention. For example, an organosilicon compound selected from the group consisting of alkoxysilanes represented by a general formula below:

(wherein, $R^{10}$ represents an unsubstituted or alkoxy-substituted alkyl group of 1 to 6 carbon atoms, and preferably from 1 to 4 carbon atoms), and partial hydrolysis-condensation products thereof may be added to the composition of the present invention as an adhesion assistant, to further improve the adhesiveness of the cured product obtained from the composition. This organosilicon compound may use either a single compound, or a combination of two or more different compounds. By adding this organosilicon compound to the composition, a more favorable level of adhesion to a wide variety of substrates can be imparted to the cured product. This organosilicon compound may also be used in combination with the titanium-containing organic compound of the aforementioned component (C), which also functions as an adhesion assistant.

Specific examples of the group $R^{10}$ include alkyl groups such as a methyl group, ethyl group, propyl group, isopropyl group, butyl group, isobutyl group, tert-butyl group or hexyl group; cycloalkyl groups such as a cyclohexyl group; and alkoxy-substituted alkyl groups such as a methoxymethyl group, methoxyethyl group, ethoxymethyl group or ethoxyethyl group. Of these, a methyl group or ethyl group is preferred. The aforementioned partial hydrolysis-condensation products of alkoxysilanes refer to siloxane compounds (siloxane oligomers containing from 2 to 100, and preferably from approximately 2 to 30, silicon atoms) that are produced by a hydrolysis-condensation reaction of the above alkoxy groups, but which retain at least one, and preferably 2 or more, residual alkoxy groups within each molecule.

In those cases where an aforementioned organosilicon compound is added to the composition of the present invention, the quantity added is typically within a range from 0.5 to 10 parts by mass, and preferably from 0.5 to 5.0 parts by mass, per 100 parts by mass of the component (A).

Furthermore, various additives may also be added to the composition to regulate properties such as the rate of shrinkage upon curing, and also to regulate properties of the resulting cured product, such as the coefficient of thermal expansion, mechanical strength, heat resistance, chemical resistance, flame retardancy, coefficient of linear expansion, and gas permeability. Moreover, inorganic fillers such as fumed silica, silica aerogel, quartz powder, glass fiber, iron oxide, titanium oxide, calcium carbonate and magnesium carbonate; and radical polymerization inhibitors (pot life extenders) such as hydroquinone, methoxyhydroquinone and 2,6-di-tert-butyl-p-cresol may also be added to the composition.

[Preparation and Curing of the Composition]

A composition of the present invention can be prepared by mixing together the component (A) and the component (B), together with the component (C) and any other optional components as required. The resulting composition can be cured rapidly by irradiation, and yields a rubber-like elastomer that exhibits powerful adhesion from immediately after curing.

Examples of suitable radiation for the irradiation include ultraviolet radiation, far ultraviolet radiation, electron beams, X-rays and γ-rays, although from the viewpoints of apparatus convenience and ease of handling, the use of ultraviolet radiation is preferred. Examples of suitable light sources for emitting the ultraviolet radiation include UV-LED, high pressure mercury lamps, ultra high pressure mercury lamps, metal halide lamps, carbon arc lamps and xenon lamps. The irradiation dose of the ultraviolet radiation (peak wavelength: 320 to 390 nm), in the case of a film of thickness 2 mm formed from the composition of the present invention, is typically within a range from 100 to 2,400 mJ/cm$^2$, and is preferably from 200 to 800 mJ/cm$^2$.

[Applications]

A cured product obtained from a composition of the present invention is useful as a protective coating or sealing agent for electrical and electronic devices, and provides excellent corrosion prevention even under severe conditions. Examples of possible electrical and electronic devices include the electrodes of liquid crystal displays, organic EL displays, flat panel displays, and plasma displays; and various electrical and electronic components within electronic circuits (substrates). These electrical and electronic devices can be sealed by coating the electrical and electronic devices with the composition of the present invention, and then irradiating the applied coating of the composition to cure the composition.

EXAMPLES

As follows is a description of the present invention based on a synthesis example, a comparative synthesis example, an example, and a comparative example, although the present invention is in no way restricted by the synthesis example or example presented below. In the following description, "parts" refers to "parts by mass".

Synthesis Example 1

A 1,000 mL reaction apparatus fitted with a stirring device, a reflux condenser, a dropping funnel, and a dry air supply unit was charged with 675 g of a polymer obtained by conducting an addition reaction of 6 mols of H(Me)SiCl$_2$ to 1 mol of a vinyl group-containing organopolysiloxane represented by the average formula shown below,

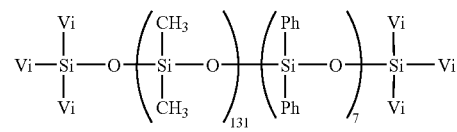

97 g of 2-hydroxy-1-acryloyloxy-3methacryloyloxypropane (product name: NK Ester 701-A, manufactured by Shin-Nakamura Chemical Corporation), 30 g of 2-hydroxyethyl acrylate, 200 mL of toluene, 26 g of triethylamine, and 2,000 ppm (on a mass basis) of dibutylhydroxytoluene (2,6-di-tert-butyl-p-cresol) as a polymerization inhibitor, and the resulting mixture was stirred while the temperature was raised to 70° C. and then held at that temperature for 7 hours. Subsequently, the mixture was left standing to cool, and was then filtered. To the thus obtained filtrate was added 4 g of propylene oxide as a neutralizing agent, and the resulting mixture was stirred for 1 hour at room temperature. The mixture was then stripped under conditions including a temperature of 100° C. and a pressure of 30 mmHg, yielding a transparent, oily organopolysiloxane represented by the formula shown below.

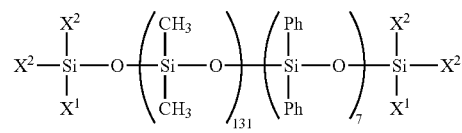

[wherein, $X^1$ is a group represented by the formula shown below,

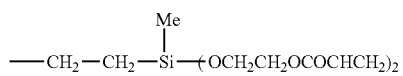

and $X^2$ is a group represented by a formula shown below.

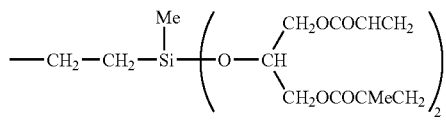

Comparative Synthesis Example 1

The reaction apparatus was charged with 571 g of an organopolysiloxane represented by the average formula shown below,

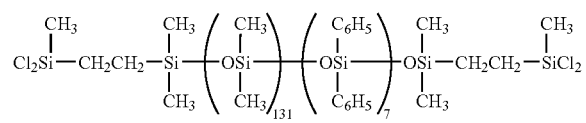

47 g of 2-hydroxy-1-acryloyloxy-3methacryloyloxypropane (product name: NK Ester 701-A, manufactured by Shin-Nakamura Chemical Corporation), 200 mL of toluene, 26 g of triethylamine, and 2,000 ppm (on a mass basis) of dibutylhydroxytoluene (2,6-di-5 tert-butyl-p-cresol) as a polymerization inhibitor, and the resulting mixture was stirred while the temperature was raised to 70° C. and then held at that temperature for 7 hours. Subsequently, the mixture was left standing to cool, and was then filtered. To the thus obtained filtrate was added 4 g of propylene oxide as a neutralizing agent, and the resulting mixture was stirred for 1 hour at room temperature. The mixture was then stripped under conditions including a temperature of 100° C. and a pressure of 30 mmHg, yielding a transparent, oily organopolysiloxane represented by the formula shown below.

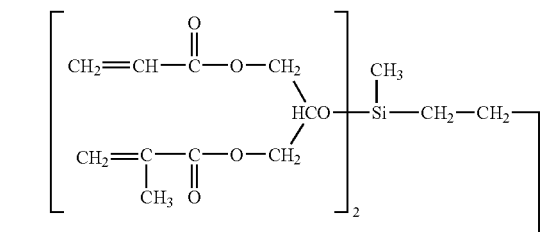

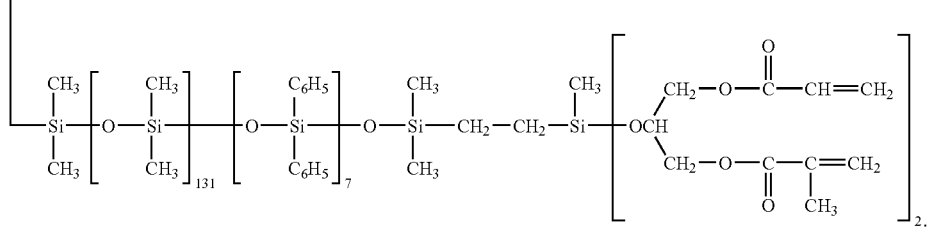

Example 1

100 parts of the oily organopolysiloxane obtained in the synthesis example 1, 2 parts of 2-methyl-1-(4-(methylthio)phenyl)-2-morpholinopropan-1-one, 2 parts of 2-hydroxy-2-methyl-1-phenylpropan-1-one, 0.5 parts of 2,4,6-trimethylbenzoyldiphenylphosphine oxide, and 0.1 parts of the titanium chelate compound represented by a structural formula shown below were mixed together, thus yielding a radiation-curable silicone rubber composition.

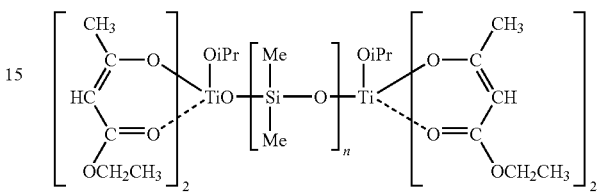

(wherein, n is 10)

This composition was poured into a mold with dimensions including a depth of 1 mm, a width of 120 mm and a length of 170 mm (in sufficient quantity to generate a thickness of 1 mm), and the composition was then irradiated with ultraviolet radiation (radiation energy: 600 mJ/cm$^2$) for 0.2 seconds inside a conveyor furnace (illumination intensity: 3,000 mW/cm$^2$) equipped with two UV-LEDs (manufactured by Nichia Corporation), thereby forming a cured product.

<Evaluation of Properties>

Physical Properties

The physical properties of the obtained cured product (hardness, elongation and tensile strength) were measured as prescribed in JIS K 6301 (wherein, hardness was measured using a spring type A hardness tester). The results are shown in Table 1.

Surface Tackiness

The existence of surface tackiness was evaluated by touching the surface of the cured product with a finger, and noting whether threads of the cured product were pulled up from the cured product when the finger was removed. The results are shown in Table 1. In the Table, if no such threads were observed, the surface tackiness was recorded as "No", whereas if threads were observed, the surface tackiness was recorded as "Yes". No surface tackiness indicates favorable surface curability, whereas the presence of surface tackiness indicates unsatisfactory surface curability.

Comparative Example 1

With the exception of replacing the oily organopolysiloxane obtained in the synthesis example 1 with the oily organopolysiloxane obtained in the comparative synthesis example 1, a composition was prepared in the same manner as the example 1, and the resulting composition was then tested in the same manner as the example 1. The results are shown in Table 1.

TABLE 1

|  |  | Example 1 | Comparative example 1 |
|---|---|---|---|
| Physical properties of cured product | Hardness (type A) | 54 | 10 |
|  | Elongation (%) | 50 | Measurement impossible |
|  | Tensile strength (MPa) | 0.6 | Measurement impossible |
|  | Surface tackiness | No | Yes |

Note:
"Measurement impossible" indicates that the property could not be measured as a result of the low degree of hardness.

What is claimed is:

1. A radiation-curable silicone rubber composition, comprising
   (A) an organopolysiloxane represented by a general formula (1) shown below:

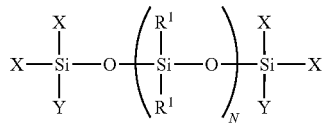
(1)

wherein, each $R^1$ represents, independently, an unsubstituted or substituted monovalent hydrocarbon group of 1 to 9 carbon atoms, each X represents, independently, a group represented by a general formula (2) shown below:

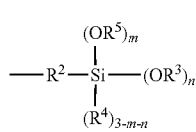
(2)

wherein, $R^2$ represents a bivalent hydrocarbon group of 2 to 4 carbon atoms or an oxygen atom, each $R^3$ represents, independently, a monovalent organic group of 4 to 25 carbon atoms that contains from 1 to 3 (meth)acryloyl groups represented by a general formula shown below:

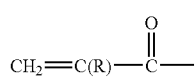

wherein, R represents a hydrogen atom or a methyl group, each $R^4$ represents, independently, an unsubstituted or substituted monovalent hydrocarbon group of 1 to 9 carbon atoms, each $R^5$ represents, independently, a monovalent hydrocarbon group of 1 to 18 carbon atoms, n represents an integer from 1 to 3, m represents an integer from 0 to 2, and n+m represents an integer from 1 to 3, although when n=1, said $R^3$ contains from 2 to 3 (meth)acryloyl groups, each Y represents, independently, a group represented by X, $R^1$ or $OR^1$ wherein, X and $R^1$ are as defined above, and N represents an integer from 8 to 10,000, and
   (B) a radiation sensitizer.

2. The composition according to claim 1, wherein Y is X.

3. The composition according to claim 1, wherein said $R^3$ contains from 2 to 3 (meth)acryloyloxy groups.

4. The composition according to claim 1, wherein said $R^3$ is at least one group selected from the group consisting of $CH_2=CHCOOCH_2CH_2-$, $[CH_2=C(CH_3)COOCH_2]_3C-CH_2-$, $(CH_2=CHCOOCH_2)_3C-CH_2-$, $(CH_2=CHCOOCH_2)_2C(C_2H_5)CH_2-$, $CH_2=C(CH_3)COOCH_2CH_2-$, $(CH_2=C(CH_3)COOCH_2)_2C(C_2H_5)CH_2-$, and $(CH_2=CHCOOCH_2)(CH_2=C(CH_3)COOCH_2)CH-$.

5. The composition according to claim 1, wherein said X is at least one group selected from the group consisting of

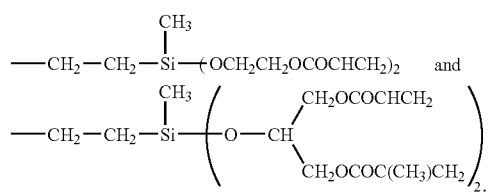

6. The composition according to claim 1, wherein said organopolysiloxane of said component (A) is a compound represented by the formula below:

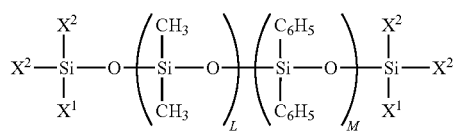

wherein, each $X^1$ represents, independently, a group represented by the formula shown below:

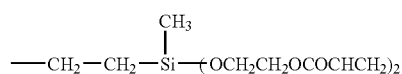

or at least one alkoxy group selected from the group consisting of a methoxy group, ethoxy group, propoxy group, isopropoxy group, butoxy group, isobutoxy group and tert-butoxy group, $X^2$ is a group represented by a formula shown below:

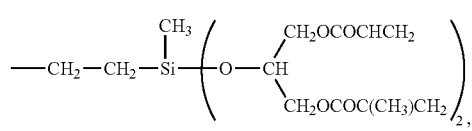

L represents an integer from 10 to 9,995, and M represents an integer from 5 to 5,000.

7. The composition according to claim 1, further comprising
(C) at least one titanium-containing organic compound selected from the group consisting of titanate compounds and titanium chelate compounds.

8. The composition according to claim 7, wherein said component (C) is at least one compound selected from the group consisting of titanate compounds represented by a general formula shown below:

$$(R^6O)_p Ti(OSiR^7R^8R^9)_{4-p}$$

wherein, $R^6$ represents an alkyl group of 1 to 8 carbon atoms, $R^7$, $R^8$ and $R^9$ each represent, independently, an alkyl group or alkoxy group of 1 to 10 carbon atoms, and p represents an integer from 0 to 4, and titanium chelate compounds that contain at least one ligand selected from amongst an acetylacetonato group, a methylacetoacetato group and an ethylacetoacetato group, and may contain a silicon atom-containing group, wherein if said titanium chelate compound contains a silicon atom-containing group, a titanium atom within said titanium chelate compound and a silicon atom within said silicon atom-containing group are bonded together via an oxygen atom.

9. The composition according to claim 1, which for every 100 parts by mass of said component (A), comprises from 0.1 to 10 parts by mass of said component (B), and in those cases where said composition includes a component (C), comprises from 0.001 to 20 parts by mass of said component (C).

10. A cured product obtained by irradiating the composition according to claim 1 with radiation.

11. The cured product according to claim 10, wherein said radiation is radiation generated from an ultraviolet light emitting diode.

12. A sealing agent comprising the composition according to claim 1.

13. A process for sealing an electrical or electronic device with a cured product of the composition according to claim 1, comprising the steps of:
coating said electrical or electronic device with said composition and irradiating said composition with radiation to cure said composition on said electrical or electronic device.

14. The process according to claim 13, wherein said radiation is radiation generated from an ultraviolet light emitting diode.

15. An electrical or electronic device sealed by a cured product obtained by irradiating the composition according to claim 1 with radiation.

16. The electrical or electronic device according to claim 15, wherein said radiation is radiation generated from an ultraviolet light emitting diode.

* * * * *